(12) United States Patent
Khalaschi et al.

(10) Patent No.: US 9,728,014 B2
(45) Date of Patent: Aug. 8, 2017

(54) SENSOR FAULT DETECTION AND DIAGNOSIS FOR AUTONOMOUS SYSTEMS

(71) Applicant: B. G. NEGEV TECHNOLOGIES AND APPLICATIONS LTD., Beer-Sheva (IL)

(72) Inventors: Elihau Khalaschi, Pethach Tikva (IL); Meir Kalech, Modiin (IL); Lior Rokach, Omer (IL)

(73) Assignee: B. G. NEGEV TECHNOLOGIES AND APPLICATIONS LTD., Beer-Sheva (IL)

(*) Notice: Subject to any disclaimer, the term of this patent is extended or adjusted under 35 U.S.C. 154(b) by 580 days.

(21) Appl. No.: 14/257,130

(22) Filed: Apr. 21, 2014

(65) Prior Publication Data

US 2016/0217627 A1    Jul. 28, 2016

Related U.S. Application Data

(60) Provisional application No. 61/814,837, filed on Apr. 23, 2013.

(51) Int. Cl.
| | | |
|---|---|---|
| *G07C 5/08* | (2006.01) | |
| *G07C 5/02* | (2006.01) | |
| *G05B 23/00* | (2006.01) | |
| *G05B 23/02* | (2006.01) | |

(52) U.S. Cl.
CPC ....... *G07C 5/0808* (2013.01); *G05B 23/0232* (2013.01); *G07C 5/02* (2013.01); *G05B 2219/34416* (2013.01)

(58) Field of Classification Search
CPC ........... G05D 1/00; G07C 5/0808; G07C 5/02

USPC .............................................. 701/29.7, 30.5
See application file for complete search history.

(56) References Cited

U.S. PATENT DOCUMENTS

| | | | | |
|---|---|---|---|---|
| 3,678,256 A | * | 7/1972 | Harenberg, Jr. ...... | G05D 1/0077 244/195 |
| 3,882,406 A | * | 5/1975 | Graves .................. | B64C 13/503 327/71 |
| 4,337,516 A | * | 6/1982 | Murphy ................. | G01D 18/00 701/116 |
| 5,222,065 A | * | 6/1993 | Krogmann ............... | G05B 9/03 714/38.12 |
| 5,512,890 A | * | 4/1996 | Everson, Jr. ............. | G01D 3/08 340/3.43 |
| 5,566,092 A | * | 10/1996 | Wang .................. | G05B 19/4184 700/159 |
| 5,719,764 A | * | 2/1998 | McClary .............. | G01C 21/165 700/79 |

(Continued)

*Primary Examiner* — Tyler J Lee
(74) *Attorney, Agent, or Firm* — Law Offices of Albert Wai-Kit Chan, PLLC (57) ABSTRACT

A method for detecting and diagnosing sensor faults in an autonomous system that includes sensors and hardware components, according to which sensors are related to hardware components and correlations between data readings are recognized online and correlation between sensors is determined. Predefined suspicious patterns are identified by online and continuously tracking the data readings from each sensor and detecting correlation breaks over time. The readings from sensors that match at least one of the patterns are marked as uncertain. For each online reading of the sensors, whenever sensors that used to be correlated show a different behavior, reporting that the reading indicates a fault. Upon identifying fault detection, diagnosing which of the internal components or sensors caused the fault, based on a function that returns the state of the sensor which is associated with the fault detection.

7 Claims, 4 Drawing Sheets

(56) References Cited

U.S. PATENT DOCUMENTS

| | | | | |
|---|---|---|---|---|
| 6,012,005 A * | 1/2000 | Gscheidle | ............... | B60T 8/171 307/112 |
| 6,112,150 A * | 8/2000 | Irons | ...................... | F02D 41/22 701/114 |
| 6,122,577 A * | 9/2000 | Mergenthaler | .......... | B60T 8/172 180/197 |
| 7,096,074 B2 * | 8/2006 | Yulevitch | ............. | G06K 9/6284 700/21 |
| 8,260,486 B2 * | 9/2012 | Salman | ............. | B60W 50/0205 701/29.1 |
| 8,306,778 B2 * | 11/2012 | Leao | .................. | G05B 23/0243 701/123 |
| 8,340,858 B2 * | 12/2012 | Jang | ........................ | B60K 6/48 701/29.2 |
| 8,423,232 B2 * | 4/2013 | Tsutsumi | ............... | B60K 6/445 477/34 |
| 8,886,394 B2 * | 11/2014 | Noonan | .................. | G01S 7/003 701/23 |
| 9,151,786 B2 * | 10/2015 | Moiseev | .................. | G05B 9/03 |
| 9,218,232 B2 * | 12/2015 | Khalastchi | ......... | G06K 9/00496 |
| 2003/0040856 A1 * | 2/2003 | Winner | ................... | B60T 8/885 701/29.7 |
| 2003/0080256 A1 * | 5/2003 | Urnes, Sr. | ............ | G05D 1/0055 244/194 |
| 2009/0082919 A1 * | 3/2009 | Hershey | ................ | F02D 41/249 701/33.4 |
| 2010/0161274 A1 * | 6/2010 | Leao | .................. | G05B 23/0243 702/179 |
| 2014/0149806 A1 * | 5/2014 | Khalastchi | ......... | G06K 9/00496 714/49 |

* cited by examiner

SENSOR FAULT DETECTION AND DIAGNOSIS FOR AUTONOMOUS SYSTEMS

CROSS-REFERENCES TO RELATED APPLICATIONS

This application claims priority of U.S. Ser. No. 61/814,837, filed Apr. 23, 2013, the entire content of which is incorporated by reference into this application.

FIELD OF THE INVENTION

The present invention relates to the field of autonomous systems. More particularly, the invention relates to a method for online detecting and diagnosing sensor faults, which has low fault detection and high diagnosis accuracy.

BACKGROUND OF THE INVENTION

Autonomous systems (such as robots) are usually equipped with sensors to sense the surrounding environment. The sensor readings are interpreted into estimations upon which the robot decides how to act. Unfortunately, sensors are susceptible to faults. These faults might lead to task failure. Detecting these faults and diagnosing a fault's origin is an important task that should be performed quickly online.

The use of robots in daily civilian and military life is increasing. Robots can replace humans in certain tasks that are too boring or too dangerous. However, these sophisticated and sometimes very expensive machines are susceptible to faults. A fault has the potential to cause mission failure or even to endanger the system itself or its surrounding e.g., a UAV (Unmanned Aerial Vehicle) can crash due to a fault.

Faults are not restricted just to hardware wear and tear. Long before a robot tries to activate some actuator it should sense the ever changing dynamic environment and compute its estimations over the world. It then needs to make choices of how to behave, and send the command to the relevant controllers to activate the actuators. Based on its actions, the world changes; thus the described operation proceeds iteratively. For example, a robot's laser distance sensor returns a reading. This reading derives an estimation, i.e., the distance to a target object. The decision making process of the robot might decide to move towards the target object. This decision is translated to the execution of a set of commands from the robot's API. Each command activates some actuators, like the robot's wheels. As the robot is getting closer to the target, the sensors react accordingly and the estimation is updated.

At each step of this cycle, a fault might occur, either due to false sensing or runtime errors (in the operating system of the robot) or due to a hardware failure. These faults need to be detected quickly and diagnosed. For example, if the code that computes the distance to the target crashes, then the robot might continue to move forever. The same can happen if the laser sensor returns a constant value or deviated from the target, or if the wheels are spinning in place.

Steinbauer et al. (A survey on the nature of faults of autonomous robot systems, ICRA Workshop on Automated Diagnosis, Repair and Re-Configuration of Robot Systems, Shanghai, China, 2011) conducted a survey on the nature of faults of autonomous robot systems. The survey participants are the developers competing in the different leagues of the Robocup competition (an annual international robotics competition). Steinbauer et al. concluded that internal hardware components such as batteries and motors are most affected by faults to connectors or communication, and are critical to mission success. They categorize these faults as platform faults. Furthermore, configuration problems greatly affect sensors, and sensors faults have similar frequency but a higher negative impact than platform faults.

Khalastchi et al. ("Online Anomaly Detection in Unmanned Vehicles", the 10th International Conference on Autonomous Agents and Multi-Agent Systems, 2011, pp. 115-122) discloses a model free, unsupervised and online approach for anomaly detection, which uses a structural model to isolate the faulty component or sensor and thus provide diagnosis and addresses faults that their symptoms appear only over time. This approach determines which sensors are correlated, and per each correlated set of sensors, their current-input's degree of being an outlier with respect to previous inputs is measured, using the Mahalanobis Distance (a descriptive statistic that provides a relative measure of a data point's distance from a common point).

Pokrajac et al. ("Incremental Local Outlier Detection for Data Streams", CIDM 2007, IEEE Symposium) discloses an incremental Local Outlier Factor (LOF) algorithm, for detecting outliers and changes of distributional behavior in various data stream applications.

There are two faults in particular that are hard to detect: (1) Stuck—the sensor returns the same reading regardless the real state, and (2) Drift—the sensor returns values which continually drift upwards (or downwards) from the real state.

The stuck fault may indicate data that is in a range of the truthful readings, and the drift may change very slowly maintaining the correct range of the sensor. Both kinds of fault express abnormal behavior. On the other hand, even an intact sensor can sometimes produce values that appear to be stuck or drifting as a reaction to the robot's current action. Thus, these faults are challenging to detect.

There are several fault detection approaches as analytical methods, data-driven or knowledge-based systems. Analytical approaches use mathematical models to compare expected outputs with observed outputs and derive a residual that is used to determine whether or not a fault has occurred. However, this approach requires expressing all the behavioral laws of every component in mathematical equations, which is a very hard task.

Data-driven approaches are model-free statistical methods. The online data of the autonomous system is processed and is searched for outliers. These outliers may indicate a fault. Data-driven have the advantage of being model-free. However, these approaches carry some disadvantages as well.

From engineering point of view, some knowledge about the system is available and it is not put into use when applying an approach which is purely data driven. Autonomous systems can provide lots of data. If the entire data is processed it will become impractical to detect faults quickly and online as the domain of autonomous systems demands. Collected data from manufactures is typically not classified for fault/non fault examples. Moreover, even data that is considered to be fault free might contain hidden faults and anomalies.

Faults of one-dimensional sensors may appear in a variety of forms. For example, the Advanced Diagnostics and Prognostics Testbed system (ADAPT—NASA Ames Research Center, CA U.S.A.) depicts the following faults to sensors on an electrical circuit: "stuck" where all values produced by the sensor are the same, "drift" where the values show a movement towards higher (or lower) values, and "abrupt" where there is a sudden large increase (or decrease) in the sensor's values. When a sensor has a state such as stuck or drift, it might be the result of the robot's action and not a fault (e.g. a UAV climb might appear as an altitude drift). Since only the robot's perception is available, correlated sensors are used for comparison. The approach suggested here, compares the state of correlated sensors which do not share component dependency. The same logical assumption is applied in both approaches. If two sensors are correlated they should react in the same manner to the robot's behavior. However, if the two sensors show different behaviors then it might be due to a fault.

Hashimoto et al. ("A multi-model based fault detection and diagnosis of internal sensors for mobile robot", Intelligent Robots and Systems, 2003 pp. 3787-3792) use Kalman filters along with kinematical models to diagnose "stuck" and "abrupt" faults to sensors of a mobile robot, as well as "scale" faults, where the (gain) scale of the sensor output differs from the normal.

It is therefore an object of the present invention to provide method for detecting and diagnosing sensor faults online, which overcomes the limitations of prior art systems.

It is another object of the present invention to provide method for detecting and diagnosing sensor faults, which has low fault detection and provides an accurate diagnosis.

It is a further object of the present invention to provide method for detecting and diagnosing sensor faults, which isolates the faulty component/sensor.

Other objects and advantages of the invention will become apparent as the description proceeds.

SUMMARY OF THE INVENTION

The present invention is directed to a method for detecting and diagnosing sensor faults in an autonomous system (such as a robot, a flight simulator or an unmanned vehicle) that includes sensors and hardware components, according to which sensors are related to hardware components and correlations between data readings are recognized online and correlation between sensors is determined. Predefined suspicious patterns are identified by online and continuously tracking the data readings from each sensor and detecting correlation breaks over time. The readings from sensors that match at least one of the patterns are marked as uncertain and a structural model is using for representing dependency of sensors on hardware components. For each online reading of the sensors, whenever sensors that used to be correlated show a different behavior, reporting that the reading indicates a fault. Upon identifying fault detection, diagnosing which of the internal components or sensors caused the fault, based on a function that returns the state of the sensor which is associated with the fault detection.

In one aspect, a structural model is used for representing the dependency of sensors on hardware components and whenever a component is identifies as faulty, determining that all of its dependent sensors report faulty data.

In one aspect, whenever a component is identifies as faulty, it is determined that all of its dependent sensors report faulty data.

Fault detection may be determined according to: abrupt changes in data readings; drift changes in data readings; stuck data readings; scale changes in data readings.

In one aspect, the method may further comprise the following steps: storing online consumed data readings in a sliding window represented by a reading matrix; upon receiving each incoming input, updating the reading matrix, while keeping the current data of the last time steps for each sensor; using the data of the reading matrix to check which sensors are correlated and which sensors display predefined suspicious patterns; seeking another correlated sensor that do not share component dependency but has the same state; seeking an implicating sensor being a correlated sensor that does not share component dependency and has a different state; and if such an implicating sensor is found, determining a failure of the uncertain sensor.

Correlation detection may be performed using the Pearson Correlation Coefficient calculation with respect to every two sensors.

The appearance of a suspicious pattern of data readings from a sensor may be associated with a sensor state.

Indication regarding the slope of a drift may be provided by using linear regression.

The diagnosis process may be performed by the following steps: reporting a sensor as a faulty sensor; extracting from the structural model the components that the faulty sensor depends on; and for each component, determining the probability of being faulty according to the number of their dependent sensors that are uncertain, as the ratio between the number of its dependent sensors that are suspected and the total number of sensors dependent which depend on the component.

BRIEF DESCRIPTION OF THE FIGURES

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

The present invention proposes a Model-Based approach that detects and diagnoses sensors faults, and relates sensors to internal hardware components to enable diagnosis of these platform related faults. According to the fault detection method, an autonomous system can detect that there is a failure in the system. The fault detection method combines a Data Driven approach with a Model-Based approach. Correlations between data readings are recognized online and tracked to detect correlation breaks over time, where suspicious patterns are detected. To accurately determine a fault has occurred, a structural model is used for the diagnosis process, which indicates sensors' dependency on hardware components, and thus enables the isolation of the faulty sensor or component. The proposes method uses a structural model to successfully detect and diagnose sensor faults online, which has low fault detection and provides an accurate diagnosis, compared to prior art systems. The structural model depicts sensors dependencies on internal hardware components and does not include a mathematical representation of components behavior and therefore, it is easier to construct. On the other hand, the proposed approach is not driven by data alone, and is not dependent on the existence of quality information and has no need for dimension reduction.

An autonomous system may be defined with a structural model that represents the sensors dependency of internal hardware components. The most fundamental entities are the sensors and components. The set of the sensors is represented by $S=\{s_1, \ldots, s_n\}$. Each sensor $s_i$ reports online readings—a single value that is changed over time as the system operates.

A second set $C=\{c_1, \ldots, c_k\}$ represents hardware components. The given structural model M maps internal components to their dependent sensors:

A dependency set M is a set of tuples of the form $<c_i, S'>$, where $c_i \in C$, $S' \subseteq S$. S' considers sensors that are dependent on a hardware component $c_i$. Given the intact predicate h(x) denotes the health of x, $\forall s_j \in S'$: $\neg h(c_i) \rightarrow \neg h(s_j)$.

If a component $c_i$ is faulty, then all of its dependent sensors ($\forall s_j \in S'$) will report faulty data. However, if a sensor $s_j$ is faulty, it does not imply that $c_i$ is faulty; $s_j$ can be faulty itself.

To formally represent the mapping between components and sensors, the sensor mapping function and its inverse component function are defined:

For a given component $c_i \in C$, $\tau(c_i)=S'$ is a mapping function that returns the set of sensors that are dependent on the component $c_i$. Given a sensor $s_i \subseteq S$ $\phi(s_i)=C_i$ is a function that returns the set of the components that the sensor $s_i$ is dependent on.

Figure 1:
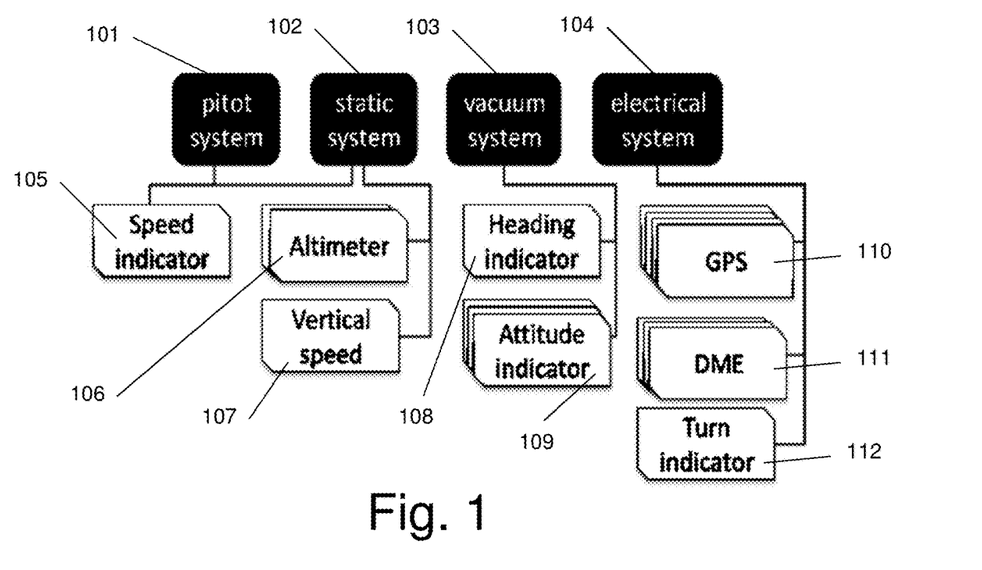
FIG. 1 illustrates a structural model of an airplane, for detecting and diagnosing sensor faults online, according to the present invention.

FIG. 1 illustrates the model proposed by the present invention. It presents a partial structural model of the cockpit panel of a Cessna 172p airplane as it modeled by FlightGear simulator. The rectangles Pilot System 101, Static System 102, Vacuum System 103 and Electrical System 104 represent the components and the rectangles Speed Indicator 105, Altimeter 106, Vertical Speed 107, Heading Indicator 108, Altitude Indicator 109, GPS 110, Distance Measuring Equipment (DME) 111, and Heading Indicator 112 represent sensors. For instance, to enable the speed indicator to return a correct reading both the pilot system and the static system 102 need to be operating correctly. The altimeter 106 depends only on the static system 102. The altimeter 106 returns two data readings—altitude and pressure, each of which is considered as a one dimensional sensor that depends on the static system 102. The same is applied for the altitude indicator 109 that returns the values of the Pitch, Roll and Yaw, which are all dependent on the vacuum system 103. The GPS 110 is a redundant sensor that besides the position values, it also returns the speed and the altitude of the aircraft. Since the GPS 110 is depends only on the electrical system 104, it will still work in case of a failure in the static system 104.

The goal of the method proposed by the present invention is to report, for each online reading of the sensors, whether the reading indicates a fault (fault detection), and upon identifying a fault detection, to diagnose which of the internal components or sensors caused the fault (diagnosis). The diagnosis algorithm relies on a function that returns the state of the sensor (i.e. abrupt, drift, stuck, scale etc.).

Fault Detection and Diagnosis

The present invention proposes an online and unsupervised approach for fault detection and diagnosis. Besides consuming the input in an online fashion, the approach is applicable online. This way, fault detection and diagnosis are returned quickly after the fault occurs, and all calculations are applicable on a computationally weak robot. Furthermore, only the online consumed data is available—no other past records of offline data are used Supervised approaches require labeled data of both normal and faulty observations. These labeled observations are not always available and cannot hope to cover every possible scenario. The proposed unsupervised approach has no need for labeled data of any kind.

According to the proposed approach proceeds according to the following steps:

(1) The consumed inputs of the sensors' readings are subjected to a correlation test that determines which sensors are correlated to each other.
(2) Each sensor is tested for showing predefined suspicious patterns. Sensors that show at least one of those patterns are marked as uncertain.
(3) The fault detection and diagnosis use the structural model to verify that the uncertain sensors reacted to a fault and to diagnose the root cause of the fault.

Steps (1) and (2) are related to a data driven approach and Step (3) is a model-based approach, which will be described later on.

Online Preprocess

According to the approach proposed by the present invention, the online consumed data is stored in a sliding window. A sliding window of size m is an m×n matrix denoted as $H^t$, that stores the latest m readings of n sensors ending at time t. A cell $H_{i,j}^t$ stores the value of sensor $s_i$ at time step t-j.

With each incoming input, H is updated, while keeping the current data of the last m time steps for each sensor. The data of H is used to check which sensors are correlated, as well as checking which sensors display predefined suspicious patterns.

It is assumed that redundant sensors that measure the same thing or sensors that are affected by the same action of the robot will show the same behavior during their last m values and return a high level of correlation. Therefore, sensors that used to be correlated and now show a different behavior might indicate that a fault has been occurred. Since there is no external observation to compare to in the domain of autonomous systems but only the system's perception is available, the knowledge of which sensors are correlated is very important.

$H^t$ is divided into two parts. The first (oldest)

$$\left(1, \ldots, \frac{m}{2}\right)$$

rows and the second (newest)

$$\left(\frac{m}{2}+1, \ldots, m\right)$$

rows. The first m/2 values of each sensor $s_i$ denoted as $H_i^{t_1}=(v_{i_1}, \ldots, v_{i_{m/2}})$ are used for a correlation test. The last m/2 values (newer) of sensor $s_i$ denoted as $$H_i^{t_2} = \left(v_{i_{\frac{m}{2}+1}}, \ldots, v_{i_m}\right)$$

are subjected to predefined suspicious patterns recognition test, as will be described later.

The correlation detection algorithm uses the Pearson Correlation Coefficient calculation with respect to every two sensors in H ($\forall s_i, s_j \in S$ (i≠j), $H_i^{t1}, H_j^{t1}$), thereby determining their level of correlation.

Given sensor $s_i$ and sliding window $H^t$, the correlated sensors set $P_{i,H^t} \subseteq S$ contains the sensors that are correlated to $s_i$, based on $H^t$: $P_{i,H^t} = \{s_j | \text{pearson } (H_i^{t1}, H_j^{t1}) > \text{threshold}\} 1$.

Then $\mathcal{P}_{H^t} = \{P_{1,H^t}, \ldots, P_{n,H^t}\}$ is defined. The knowledge of the correlated sensors will be used to determine whether a suspicious pattern in a sensor is due to a fault or it is a normal reaction to the system's behavior. A suspicious pattern for a single-dimension sensor is an observable pattern of the sensor values over time, which might indicate a fault. The pattern may be a normal reaction to the system's behavior.

Suspicious patterns are predefined and are sensor specific. The appearance of a suspicious pattern in a sensor is associated with a sensor state. The resulting function is a function that recognizes these suspicious patterns and returns the sensor state.

Focus will be on three sensor states:
A sensor $s_i$ can be in one of the following sensor states:
"stuck"—$\forall v_{i_x}, v_{i_y} \in H_i^{t2} \ v_{i_x} = v_{i_y}$
"drift"—the values in $H_i^{t2}$ show a movement towards higher values or a movement towards lower values.
"ok"—otherwise.

The function σ: ($H^{t2}, s_i$)→{stuck, drift, ok} returns the state of $s_i$ according to its latest m/2 values ($H^{t2}$).

Since sensors are noisy, a drift is not necessarily a smooth movement towards higher or lower values. A simple linear regression can be used to indicate the slope of the drift. The function σ returns a drift state if the slope is higher than a threshold value.

The reason to focus on stuck and drift faults is that these are common to single dimensional sensors and yet are hard to be classified as faults. For example, the altimeter gage in a UAV might appear to be stuck when the UAV is maintaining its altitude, or appear to be drifting when the UAV is gaining altitude, but both are reactions to the UAV's normal behavior. However, if the altimeter gage appears to be drifting while the UAV is maintaining altitude or the altitude gage is stuck while the UAV is gaining altitude, then these are the expressions of a fault.

If a sensor's state is changed to "stuck" or to "drift" it cannot be concluded that it is due to a fault, since the values could still be expressing a reaction to the system's normal behavior. However, the sensor is considered as uncertain.

Given the sensor state of $s_i$ at time t σ: ($H^{t2}, s_i$), then if σ: ($H^{(t+1)2}, s_i$)≠"ok" and σ: ($H^{t2}, s_i$)≠σ: ($H^{(t+1)2}, s_i$) then $s_i$ is declared as an uncertain sensor. The set $L^t$ is used to denote the set of uncertain sensors at time t. In addition $\mathcal{L}^t = \cup_{i=t-x}^{t} L^i$ contains all sensors that were marked as uncertain in the last x time steps.

By extracting information out of the correlations between sensors in $\mathcal{P}_H$ and the system's structural model M, it is possible to conclude whether or not the recognized suspicious pattern of a sensor is due to a fault. Also, online preprocessing is used in the fault detection and diagnosis procedures.

Fault Detection

Detection of a suspicious pattern in a sensor is not sufficient to implicate the sensor as faulty. There is still a need to check whether it reflects a normal behavior or a fault. The present invention proposes using the correlated sensor set to indicate a failure. A high correlation rate between two sensors which depend on two different components in the structural model can be the result of the following:

(1) Redundant sensors (dependent on different internal components) that measure the same thing. For example, the altimeter and the GPS indicated altitude. If one system fails the other can be used as a backup.

(2) Sensors that react to the same action of the robot. For example the Pitch angle and the climb rate indicator are correlated as the UAV's elevator is invoked.

Figure 2:
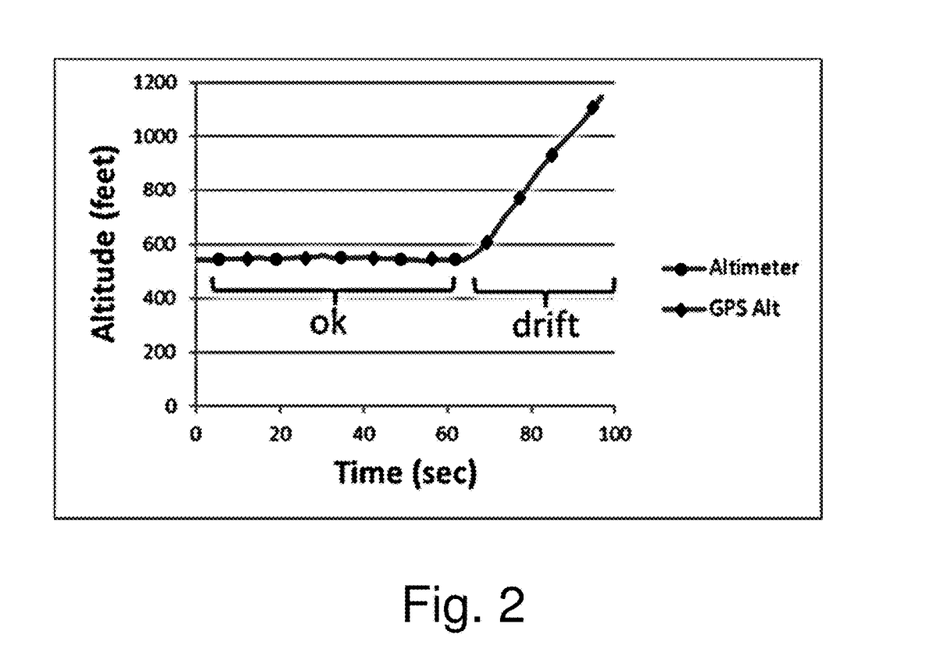
FIG. 2 illustrates a situation in which both altimeter and GPS altitude are drifting.
Figure 3:
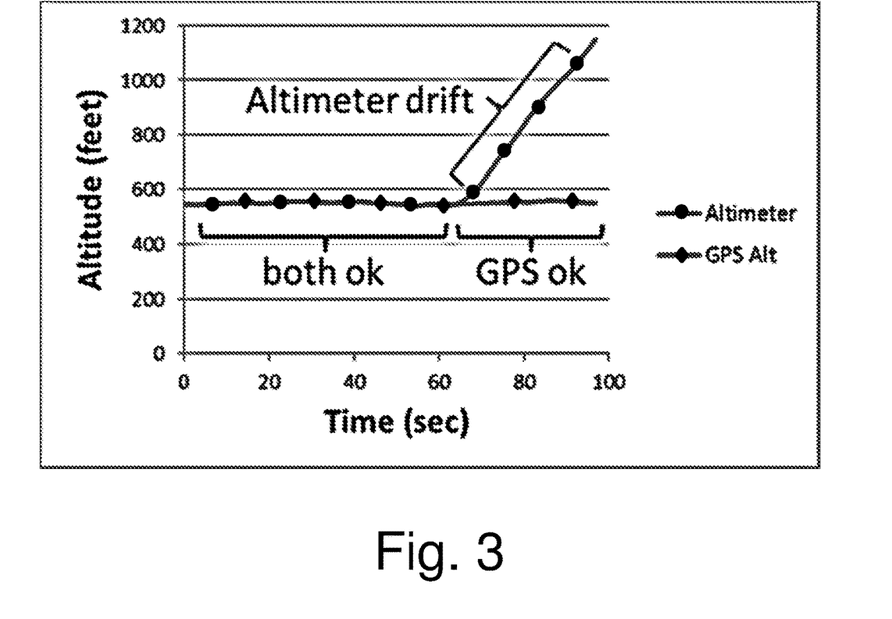
FIG. 3 illustrates a situation in which the altimeter "drifts" while the GPS is not "drifting".

In these two cases, one sensor can either implicate or clear an uncertain correlated sensor of suspicion. If one sensor is faulty or displays a faulty behavior due to dependency on a faulty component, then it is reasonable to assume that the other sensor was not affected by the fault and still reflects the robot's behavior. The same cannot be said about two correlated sensors that share a component dependency, since both sensors can be affected by the same fault. For instance, in case where the altimeter shows a drifting state, if it is the result of the UAV's climbing, then the GPS indicated altitude (which depends on a different component and was determined as correlated to the altimeter) also changed its state to drift and the altimeter is cleared of suspicion, as shown in FIG. 2. However, if the drift was a result of a fault and not of the UAV's behavior, then every other correlated sensor from another internal component dependency should not be affected by the fault, and therefore poses a different state than the altimeter. In this case, a fault is declared, as illustrated in FIG. 3.

It is important to guarantee first that there is no possibility to clear the uncertain sensor of its suspicion (i.e. look for another correlated sensor that do not share component dependency but has the same state). Only then it is possible to look for an implicating sensor (i.e. a correlated sensor that does not share component dependency and has a different state) in order to verify the failure of the uncertain sensor.

If for instance, a UAV is taking off the runway, before it gains altitude, the altimeter 106, which is depends on the static system 102 and the heading indicator 108 which is depends on the vacuum system 103, were both correlated (since both were idle). But then, during take-off, the altimeter 106 appears to drift, while the heading indicator 108 does not. This case would have implicated the altimeter 106, unless the GPS 110 indicated altitude was also found drifting, thereby clearing the altimeter 106 of suspicion.

Algorithm 1 (specified below) presents a fault detection algorithm that determines whether a sensor with a suspicious pattern state is the result of a fault. The fault detection algorithm is invoked with each input reading of the sensors. The algorithm obtains the updated sliding window $H^t$, the updated set $\mathcal{P}_{H^t}$ that contains per each sensor $s_i$ a set of $s_i$'s correlated sensors $P_{i,H^t}$, and the updated uncertain sensors set $L^t$ as an input.

Fault Detection Algorithm (Algorithm 1)

Input:
$H^t$—m×n sliding window at time t
$\mathcal{P}_{H^t}$—the sets of correlated sensors at time t
$L^t$—the uncertain sensors set at time t
Output: a fault detection report
For each sensor $s_i \in L^t$
$\quad C_i \leftarrow \phi(s_i)$
For each sensor $s_j \in P_{i,H^t}$
$\quad C_j \leftarrow \phi(s_j)$
If σ: ($H^{t2}, s_i$)=σ: ($H^{t2}, s_j$)$\wedge C_i \cap C_j = \phi$
Return;
suspected←false
For each sensor $s_j \in P_{i,H^{t+1}}$ $C_j \leftarrow \phi(s_j)$
If $\sigma: (H^{t2}, s_i) \neq \sigma: (H^{t2}, s_j) \wedge C_i \cap C_j = \phi$
suspected←true
Break;
If suspected
Report "fault detected,", $s_i$, "is suspected"

The algorithm iterates through every uncertain sensor (line 3 in Algorithm 1). $C_i$ is the set of internal components that $s_i$ is dependent on (line 4 in Algorithm 1). $C_i$ is extracted from the structural model M by using the mapping function φ. Lines 5-8 in Algorithm 1 try to find a sensor that clears the uncertainty of $s_i$, i.e., whether there exist a sensor $s_j$ correlated to $s_i$ that share the same state but is dependent on different components. Every sensor $s_j$ in $s_i$'s correlated set $P_{i,H'}$ is checked (as illustrated in line 5 of Algorithm 1). $C_j$ is the set of components that $s_j$ is dependent on (line 6 of Algorithm 1). If $s_i$ and $s_j$ share the same state (σ: $(H^{t2}, s_i)$=σ: $(H^{t2}, s_j)$) and do not share dependent components $(C_i \cap C_j = \phi)$ then $s_i$ is cleared of suspicion (lines 7-8 of Algorithm 1).

If the algorithm did not return, then lines 9-14 of Algorithm 1 check if an implicating sensor exists, i.e. whether a sensor $s_j$ exists, which is correlated to $s_i$ that does not share the same state and is dependent on different components. In the same manner iterations are made through each one of the $s_i$'s correlated sensors (line 10 of Algorithm 1). This time, a sensor $s_j$ that shares the same state as $s_i$ but does not share component dependency is sought (line 12 of Algorithm 1). If such a sensor is found, then the search is stopped (line 14 of Algorithm 1) and a fault is reported (lines 15, 16 of Algorithm 1). Upon fault detection, the diagnosis procedure (described next) is invoked.

The previous subsection describes how an uncertain sensor $s_i$ becomes suspected for a fault. The following diagnosis algorithm (Algorithm 2) is invoked upon fault detection. Algorithm 2 is invoked with the suspected sensor $s_i$ as an input. The fact that $s_i$ is suspected and not any other $s_j$ that was correlated to $s_i$ is because $s_i$ was the sensor that changed its state to drift or to stuck, while the other correlated sensors did not reflect the same state. Since it was concluded that the change of $s_i$'s state was not a reaction to the robot's behavior, then it is determined that $s_i$ is suspected for a fault.

When a sensor is reported of having a stuck or drift state, it can either be a single sensor fault, or an expression of a fault of an internal component that the sensor is dependent on. If an internal component is faulty, then all of its dependent sensors should display a faulty behavior. Therefore, the method checks for each of the other sensors that are dependent on the same internal component if they are suspected (i.e. changed their state into drift or stuck). If so, the internal component can be included in the report.

For example, when the heading indicator 108 was reported as suspected for a fault, the method checks if the attitude indicator's pitch, roll and yaw changed their state as well. If so, then the vacuum system 103 is also reported as suspected of having a fault.

Diagnosis Algorithm (Algorithm 2)
Input:
$s_i$—the suspected sensor
$\sigma_i$—the state of $s_i$
$\mathcal{L}^t$—the set of all uncertain sensors from the last x time steps
Output: a diagnosis report
Report $s_i$ is a candidate with a fault state $\sigma_i$
$C_i \leftarrow \phi(s_i)$
For each $c_k \in C_i$ $S_d \leftarrow \tau(c_k)$ $$p \leftarrow \frac{|S_d \cap \mathcal{L}^t|}{|S_d|}$$

Report $c_k$ is a candidate with probability p
Return;

The diagnosis process reports $s_i$ as a faulty sensor (line 3 of Algorithm 2). Then, it extracts from the structural model the internal components that $s_i$ is dependent on (line 4 of Algorithm 2). For each of those internal components (line 5 of Algorithm 2) the diagnosis process determines their probability of being faulty according to the number of their dependent sensors that are uncertain (are in the suspect set $\mathcal{L}^t$). $S_d$ is a set containing the component $c_k$'s dependent sensors (line 6 of Algorithm 2). $c_k$ is reported as having the probability of being faulty as the ratio between the number of its dependent sensors that are suspected $|S_d \cap \mathcal{L}^t|$ and the total number of $c_k$'s dependent sensors $|S_d|$ (line 7 of Algorithm 2).

Since an internal component fault might be expressed by its dependent sensors in different time intervals, the suspected set $\mathcal{L}^t$ is used, and returns a probability of being fault. If $L^t$ is used rather than $\mathcal{L}^t$, then only sensors that changed their state during this particular time frame could have implicate the component $c_k$. However, some of the sensors might have already changed their state and hence are not suspected during this particular time frame. This would result in a low probability of $c_k$ faultiness. Therefore, $\mathcal{L}^t$ is used where suspected sensors remain for several time frames.

For example, a static system failure causes the altimeter 106 to be stuck immediately and the vertical speed indicator to drift downwards a few seconds later. Since both sensors are in $\mathcal{L}^t$, the static system 102 is reported at a probability of 1. If $L^t$ would have been used, the static system would have a probability of 0.5 for being faulty.

The reason for returning a probability rather than determining $c_k$ faultiness only if all its dependent sensors are suspected, is due to the fact that some sensors might take very long time to react to $c_k$'s failure, while all others are already suspected. In this case, $c_k$ will be reported and an indication about the degree of its faultiness will be provided.

For example, when the electrical system 104 fails, some instruments such as the GPS 110 fail immediately, but the turn indicator 112 in particular, will take 30-60 seconds to start drifting downwards. This is due to the fact that the unpowered gyro still spins, though slowly loosing speed. Hence, the turn indicator's drift effect is yet to show. In this case, the electrical system 104 will not be cleared from all suspicion just because one instrument is yet to show suspicion. Therefore, the probability is returned, which in this particular example is above 0.9.

Experimental Results

Two domains were used to evaluate the fault detection and diagnosis algorithms, proposed by the present invention. The first domain is a laboratory robot (shown in FIG. 4), which has two wheels, 3 sonar range detectors in the front, and 3 infrared range detectors which are located right above the sonars, making the sonars and infrareds redundant systems to one another. This redundancy reflects real world domains, such as unmanned vehicles (aerials, ground underwater etc.) in which fault tolerance is very important for successful completion of a mission. When a sensor is damaged, then another sensor can be used to fulfill the perception. Such is the case with UAVs, where a set of different sensors measure the UAV's 3D location. If the GPS fails, other altitude gages, accelerometers and attitude gages can be used.

Figure 4:
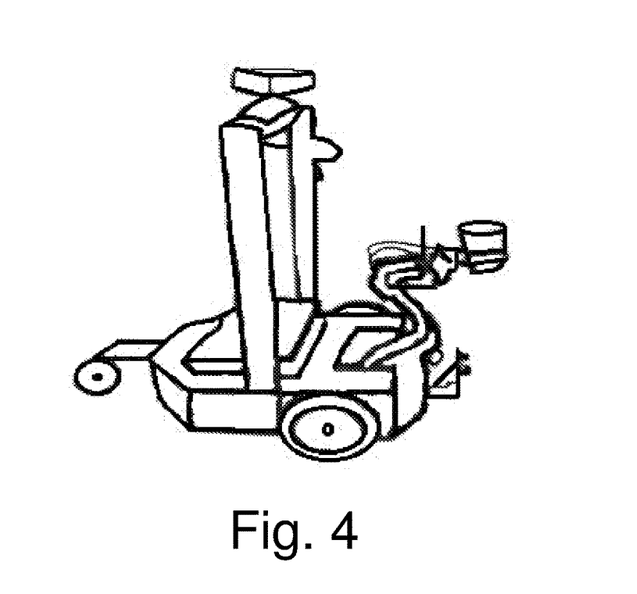
FIG. 4 illustrates a laboratory robot for evaluation of the proposed structural model.

The robot also has 5 degrees of freedom arm. Each joint is held by two electrical engines, which provide a sensed reading of the voltage applied by their action. To mimic some internal component depths 3 abstract internal components have been defined:
sonar power supplier
infrared power supplier
arm power supplier.

17 different scenarios were devised, which included a scenario without injected faults and scenarios that included different injected faults while the robot performed different tasks. Faults were injected to each type of sensor (motor voltage, infrared and sonar). The injected faults to the sensors were of stuck or drift type. These faults were injected to one or more sensors in different time intervals. Cases of faults to sensors that depend on the same components and on different internal components have been covered. Failing one of the three power suppliers described above causes each of the dependent sensors to fail. The robot's behavior was either to move, to stand still, or to move its arm to a given position.

Figure 5:
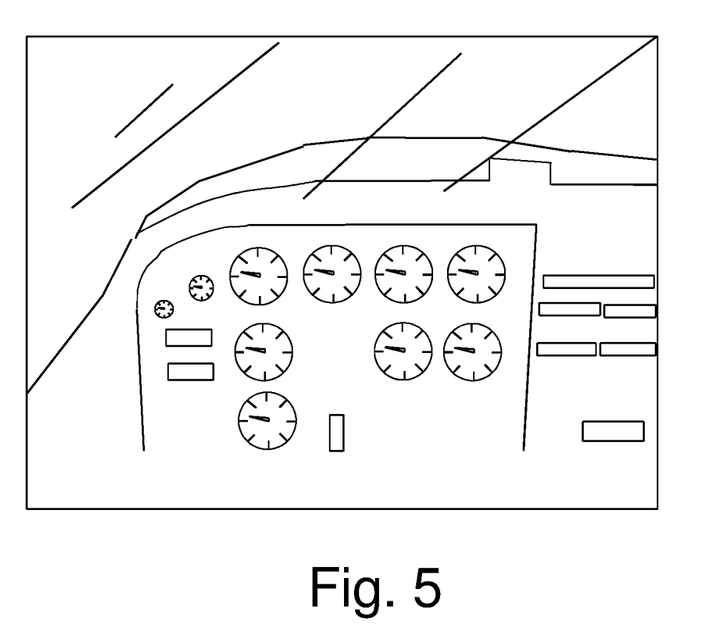
FIG. 5 illustrates a flight simulator for evaluation of the proposed structural model.

The second domain is a high fidelity flight simulator the (FlightGear), shown in FIG. 5. This open source simulator is built for and used in academic research. Furthermore, it realistically simulates flight instrumental faults such as an altimeter stuck, or system faults. For example, if the vacuum system 103 fails, then the gyros responsible for the attitude indicator and the heading indicator slowly lose their spin speed, causing the indicators to drift slowly and deviate from the readings of the turn indicator and compass. These features make the FlightGear simulator to be very suitable to test the proposed method.

An autopilot, which flies the aircraft according to its sensor readings has been implemented. 16 flights that included 4 to 6 instrumental failures at different times were used, while the UAV takes off and makes a few turns. The altimeter, airspeed indicator and compass have been failed.

On this data set of flights, the following parameters have been evaluated:
(1) the contribution of using the structural model as an addition to the suspicious pattern recognition for fault detection;
(2) the accuracy of the proposed method, comparing to similar competing fault detection approaches.

As described, the fault detection technique consists of two parts, the Data Driven part which reports suspicious patterns in sensors, and the Model-Based part which uses a structural model to determine whether a suspicious pattern is a fault.

The fault detection algorithm was compared to the same algorithm without the Model-Based part (i.e., fault is reported whenever a suspicious pattern was recognized).

To evaluate each approach, the detection rate and the false alarm rate were calculated. The best possible result for the detection rate is 1 indicating that all faults were detected. The best possible result for the false alarm rate is 0 indicating that no false alarms were raised.

In addition, two scenarios for diagnosis were tested—a takeoff and a free flight. For each scenario every possible instrumental or system failure were tested, and a combination of multiple faults. There are 8 types of instruments and 4 types of systems that can be failed. In total, 16 flights have been examined for each scenario. These two data sets have been used to test the diagnosis accuracy of the proposed approach.

Results

Figure 6:
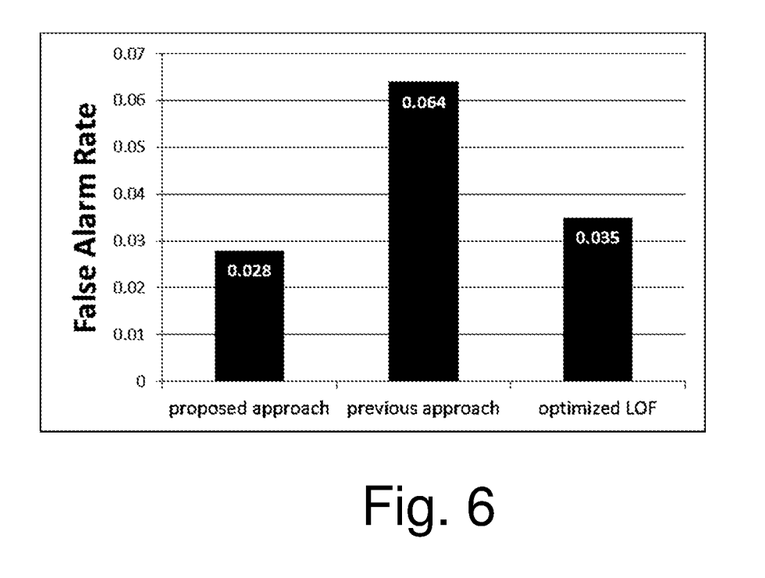
FIG. 6 illustrates the false alarm rates of the method proposed by the present invention, compared to prior art methods.

The evaluation of the fault detection over the 16 flights produced the following results:
(3) without the use of the structural model in the proposed fault detection algorithm, the false alarm rate is very close to 1 whereas with the use of the structural model the false alarm rate is very close to 0, indicating the contribution of using the structural model. (2) All competing algorithms had a detection rate of 1—all faults were detected. (3) The proposed approach also diagnosed the failing sensor correctly. (4) The false alarm rates of the competing approaches are shown in FIG. 6.

The proposed approach has a false alarm rate of 0.028. This rate is less than half of the false alarm rate of prior art approaches. Moreover, most of the false reports of the proposed approach were produced by the same sensor. When this sensor is suppressed there are virtually no false alarms. The lower false alarm rate is explained by the fact that the proposed approach uses the additional knowledge of component dependency to clear or implicate an uncertain sensor.

In the Robotic domain 17 diagnosis scenarios were tested. The results are a fault detection rate of 0.96 and a false alarm rate of 0.013. One fault out of 26 faults was not detected. The faulty sensor was suspected but was cleared after another correlated sensor of a different component dependency shared the same state. All detected faults were diagnosed correctly, i.e., the sensors and internal components that were reported matched the injected faults and the report was given at the time of the fault injection.

Figure 7:
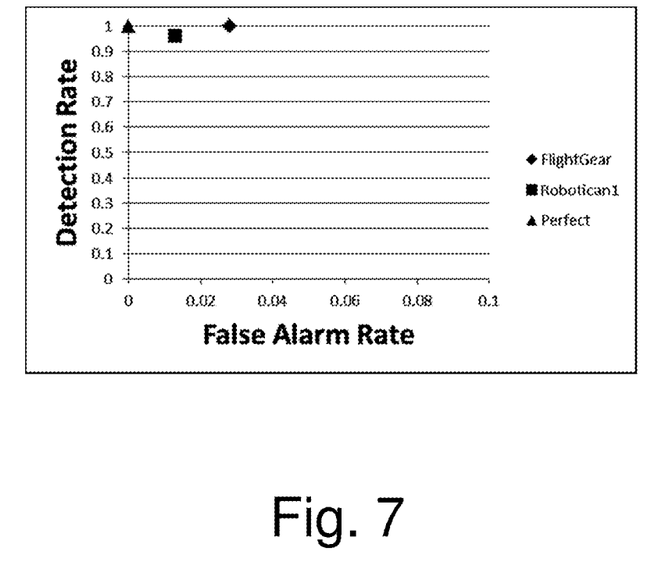
FIG. 7 illustrates a ROC chart of a laboratory robot and the flight simulator.

FIG. 7 illustrates the results the proposed approach of the two domains in a Rate Of Change (ROC) chart, which describes the entire space of fault detection: the X-axis is the false alarm rate and the Y-axis is the detection rate. A classifier is expressed as a 2D point. The perfect anomaly detector is located at point (0,1). In both domains, the approach proposed by the present invention is very close to the perfect fault detector (theoretically with a detection rate of 1 and a false alarm rate of 0). The fault detection method is compared to prior art methods: (1) the algorithm presented in [0008] Khalastchi et al. (denoted as "m.distance") and to the Local Outlier Factor (LOF) method of Pokrajac et al. The results show that the method proposed the present invention is more accurate and with high success rates of detecting and diagnosing faults in both domains.

In the flight simulator domain, two additional scenarios have been evaluated—a takeoff and a free flight, 16 flights per each scenario. These scenarios were used to further evaluate the diagnosis aspect of the proposed approach. All instrumental failures and system failures were diagnosed. The following cases show the need for the proposed diagnosis algorithm:

Case 1: a static system failure causes the altimeter to be stuck, and the airspeed indicator to drift down to 0 a few seconds later. The static system was suspected at a probability of 1 due to the fact that suspected sensors remain suspected for a given time (a few seconds). The drift of the airspeed indicator caused the pilot system to be suspected as well and included in the diagnosis.

Case 2: a failure to the pilot system causes the airspeed indicator to drift upwards, unless there is a failure to the static system as well, which causes the airspeed indicator to be stuck. Note that the proposed approach is unaware of these rules, but still recognizes these effects as suspected faults and reports the pilot system as suspect when needed.

Case 3: a failure to the electrical system causes many instruments to fail immediately. But the turn indicator starts to drift downwards only after 30 seconds to 1 minute and is yet to be detected. This case justifies the use of probability to determine a suspected internal component. The electrical system is suspected in a probability greater than 0.9.

Case 4: a failure to the attitude indicator (and not the vacuum system) causes some sensors to fail i.e. pitch, roll and yaw angles. The proposed approach reported that the vacuum system is suspected at a probability of 0.8. The heading indicator which is also dependent on the vacuum system is intact. If the proposed approach did not use a probability then the heading-indicator's health would have cleared the vacuum system suspicion. Even though this case does not justify the use of a probability, the heading indicator 108 may yet fail as in case 3 and thus a probability is used.

Redundancy and correlation: since the proposed approach tries to detect faults to single-dimensional sensors, it relies heavily on the additional data provided by redundant sensors. The correlation is used to indicate which sensors are redundant. When the knowledge of redundant sensors is present, it is suggested to use it instead. However, some correlations between irredundant sensors might also help in fault detection. For example, a climbing rate sensor is usually correlated to the pitch sensor even though they are not redundant with respect to each other. Yet, possessing different states (e.g. pitch is "ok", climbing rate is "drifting" down) might indicate a fault (e.g. climbing rate is faulty or worse, an aircraft stall).

If attributes that calculate the expected value of a sensor are present, then they can be used as "redundant sensors" as well. For instance, the attribute speed calculated from GPS position samples can be used as a redundant sensor to a speed sensor.

Suspicious patterns: as described, the fault detection algorithm is provided with a function σ that recognizes known suspicious patterns in a sensor data. Therefore, σ is domain specific and should be implemented according to the expression of known faults in the system's sensors. Since σ is a part of the approach's input the approach is still general and not contained strictly to patterns such as "drift" and "stuck". σ also handles noise issues. For instance, in the tested domains the "drift" state was calculated with a linear regression slope. The only concern of the fault detection approach is to determine whether a suspicious pattern is a reaction to a behavior of the system or a reaction to a fault.

Algorithm parameters: the fault detection algorithm and the diagnosis algorithm used different parameters. These parameters are domain specific, and should be adjusted according to a labeled data set. Setting the correlation threshold too low could result in more false positives as well as false negatives since irrelevant sensors are used to implicate or clear uncertain sensors of suspicion. Setting the threshold too high could result in a higher rate of false negatives due to approaches reliance of redundancy. The sliding-window size affects the time of calculation as well as the false negatives rates. Setting it too small could result in insufficient data size to determine a good correlation by Pearson or recognize a suspicious pattern by the σ function. The largest size which is in the capabilities of online calculation in the system may be used.

The time (x) a sensor remains suspected (in $\mathcal{L}^r$) affects the implication of an internal component. The longer the time is, the more likely it is for an internal component to be included in the diagnosis. Since past suspicions become, in time, irrelevant to current events then x should be limited. The setting of x is domain specific and should be learned from labeled diagnosis data set.

Structural model and diagnosis: the presented structural model contains several levels of depth describing component dependency (e.g. a sensor is dependent on a component that is dependent on another component). The diagnosis algorithm can be applied recursively, implicating each component at level i, if all its dependent components at level i+1 are suspected of having a fault. Thus, a component level fault is unmasked.

The proposed approach gives sensors an even weight when implicating a suspected component. Different weights can be used in the model according to the sensor's ability to indicate that the internal component is failing. In the flight simulator domain, sensors that would have made the fault detection and diagnosis too easy have not been monitored. The vacuum intake sensor could easily implicate the vacuum system, and the voltmeter and ampermeter sensors could easily implicate the electrical system. These kinds of sensors may be modeled with a high weight.

The approach proposed by the present invention shows that when given a structural model and sensor readings it can detect sensor related faults that occur over time and diagnose them online with high precision. The structural model has been used to diagnose internal components.

The main advantages of the proposed approach are the ability to distinguish a fault from a normal behavior when a suspicious pattern is recognized in a sensor, the ability to detect faults that occur over a period of time, and the ability to successfully diagnose root causes. The disadvantages are the reliance on redundancy, the reliance on predefined suspicious patterns, and the return of the degree of faultiness of internal components rather than a deterministic answer.

Evaluation of the proposed has been conducted on a laboratory robot that applied different behaviors upon which faults were injected to its sensor readings, as well as on a high fidelity flight simulator, which presented a more rich and complex environment. The system and instrumental faults which are already built-in and realistically mimic faults that occur in real flights.

The above examples and description have of course been provided only for the purpose of illustration, and are not intended to limit the invention in any way. As will be appreciated by the skilled person, the invention can be carried out in a great variety of ways, employing more than one technique from those described above, other than used in the description, all without exceeding the scope of the invention.

What is claimed is:

1. A method for detecting and diagnosing sensor faults in autonomous systems including sensors and hardware components, comprising:
   a) relating sensors to hardware components, using a structural model;
   b) consuming, on the fly, data readings from sensors;
   c) recognizing, on the fly, correlations between data readings and determining correlation between sensors;
   d) identifying predefined suspicious patterns, associated with a sensor state, by continuously tracking the data readings from each sensor and detecting correlation breaks over time;
   e) marking the readings from sensors that match at least one of said patterns, as uncertain;

f) for each uncertain marked reading of said sensors, identifying and reporting that said reading indicates a fault whenever sensors that used to be correlated show a different behavior; and
g) upon identifying a fault, diagnosing which of the internal components and/or sensors caused said fault, by:
  i) reporting a sensor that caused said fault as a faulty sensor;
  ii) extracting from said structural model, the components that said faulty sensor depends on; and
  iii) for each component, determining a probability of being faulty according to the number of dependent sensors of said component that are uncertain, as a ratio between a number of dependent sensors of said component that are suspected, and a total number of sensors which depend on said component.

2. The method of claim 1, further comprising determining that all of a component's dependent sensors report faulty data whenever said component is identified as faulty.

3. The method of claim 1, wherein fault detection is determined according to:
  abrupt changes in data readings;
  drift changes in data readings;
  stuck data readings;
  scale changes in data readings.

4. The method of claim 1, further comprising:
a) storing online consumed data readings in a sliding window represented by a reading matrix;
b) upon receiving each incoming input, updating said reading matrix, while keeping the current data of the last time steps for each sensor;
c) using the data of said reading matrix to check which sensors are correlated and which sensors display predefined suspicious patterns;
d) seeking another correlated sensor that do not share component dependency but has the same state;
e) seeking an implicating sensor being a correlated sensor that does not share component dependency and has a different state; and
f) if such an implicating sensor is found, determining a failure of the uncertain sensor.

5. The method of claim 1, wherein correlation detection is performed using Pearson Correlation Coefficient calculation with respect to every two sensors.

6. The method of claim 3, wherein indication regarding a slope of a drift is provided by using linear regression.

7. The method of claim 1, wherein the autonomous system is selected from the group of:
  A robot;
  A flight simulator;
  An unmanned vehicle.

\* \* \* \* \*